Figure 5:
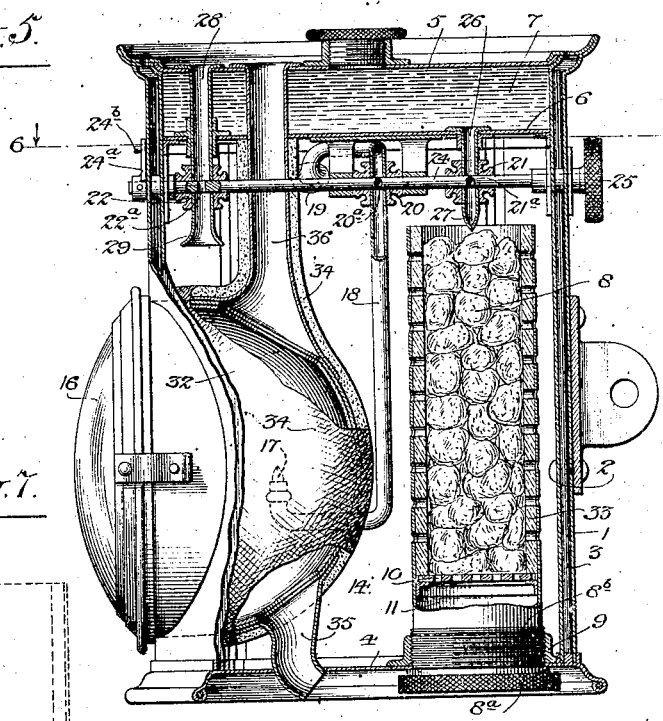

No. 617,774. Patented Jan. 17, 1899.
T. E. SCANTLIN.
ACETYLENE GAS GENERATING LAMP.
(Application filed Aug. 14, 1897.)
(No Model.) 2 Sheets—Sheet 1.
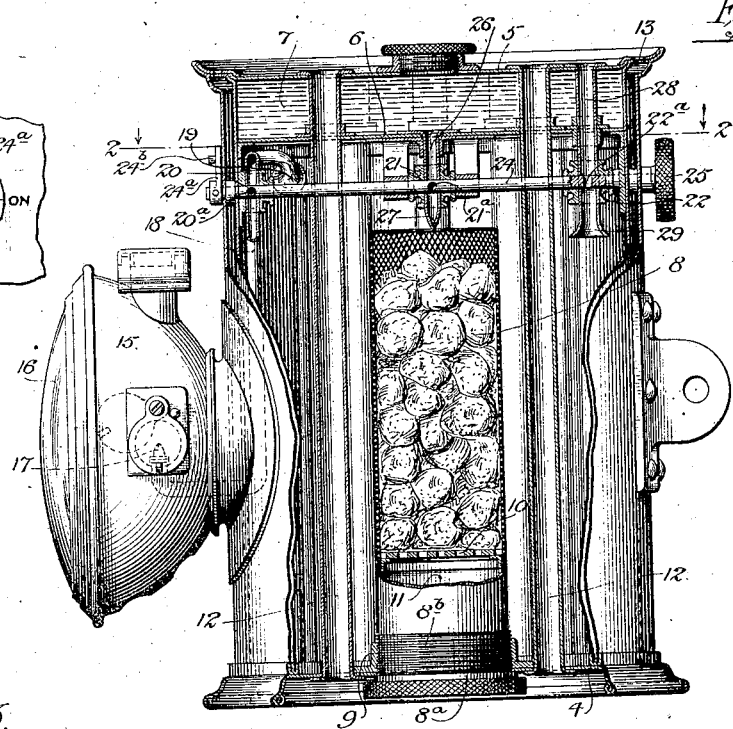
Inventor.
Thomas E. Scantlin.
Witnesses:—
Louis M. S. Whitehead.
H. H. Bernhard.
By his Attorneys,
C. A. Snow & Co.

No. 617,774. Patented Jan. 17, 1899.
T. E. SCANTLIN.
ACETYLENE GAS GENERATING LAMP.
(Application filed Aug. 14, 1897.)
(No Model.) 2 Sheets—Sheet 2.

Witnesses:
Louis M. F. Whitehead.
H. A. Bernhard.

Inventor:—
Thomas E. Scantlin.
By his Attorneys,
C. A. Snow & Co.

United States Patent Office.

THOMAS E. SCANTLIN, OF LAFAYETTE, INDIANA, ASSIGNOR OF ONE-HALF TO JOHN ROSS, OF SAME PLACE.

ACETYLENE-GAS-GENERATING LAMP.

SPECIFICATION forming part of Letters Patent No. 617,774, dated January 17, 1899.

Application filed August 14, 1897. Serial No. 648,247. (No model.)

*To all whom it may concern:*

Be it known that I, THOMAS E. SCANTLIN, a citizen of the United States, residing at Lafayette, in the county of Tippecanoe and State of Indiana, have invented a new and useful Acetylene-Gas Bicycle-Lamp, of which the following is a specification.

My present invention relates to improvements in portable lamps especially designed for service as a bicycle-lamp and in which I have embodied an acetylene-gas generator for producing a brilliant light to illuminate the pathway of the vehicle.

Although I have illustrated my invention as especially designed for service as a bicycle-lamp, it will be understood that I do not strictly limit the invention to lamps of this character, because I am aware that the device may be used for other purposes where it is desired to have a portable lamp having its parts constructed to obviate displacement of said parts and splashing or spilling of its liquid contents when the device is moved.

The primary object of this invention is to provide in a compact form a simple lamp embodying in its construction an acetylene-gas generator the parts of which are arranged to prevent splashing of the water required for use in connection with the calcium carbid in the generation of the gas to be consumed at the burner of the lamp.

A further object of the invention is to provide a carbid-receptacle which may be easily placed in or removed from the body of the lamp, thus providing for ready access to the carbid for renewing the same when spent or exhausted.

A further object of the invention is to provide for the circulation of a fluid for the purpose of keeping cool the interior working parts of the lamp, thus preventing the lamp from being heated too highly by the heat evolved by the combination of the calcium carbid with the water.

A further object of the invention is to construct a lamp in which the surfaces exposed to the chemical action of the acetylene gas are protected to obviate the formation or production of the salt or incrustation which is evolved by the chemical action of the acetylene gas in contact with certain metals—such, for example, as brass, copper, or silver—and which salt or incrustation is found to be highly explosive when exposed to the air.

A further object of the invention is to provide an improved valve mechanism controllable from a single operating device in a manner to open the water-inlet valve and the gas-outlet valve and close the vent valve and tube all at one operation, a reverse adjustment of this single operating device serving to close the water-inlet and the gas-outlet valves and to open the vent valve and tube.

With these ends in view the invention consists in the novel combination of elements and in the construction and arrangement of parts, all as will be hereinafter fully described and claimed.

To enable others to understand my invention, I have illustrated the same in the accompanying drawings, forming a part of this specification, and in which—

Figure 7:
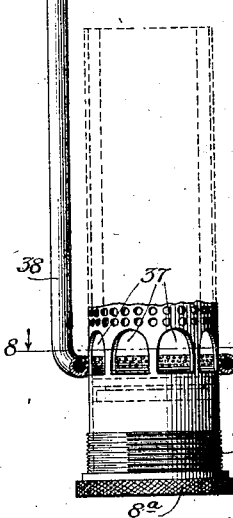
Figure 8:
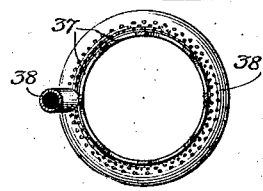
Figure 6:
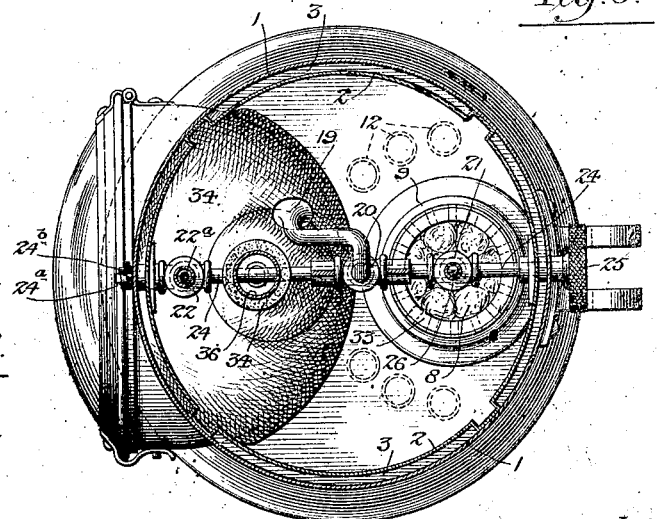

Figure 1 is a vertical sectional elevation of a portable lamp embodying my invention. Fig. 2 is a horizontal sectional view on the plane indicated by the dotted line 2 2 of Fig. 1. Fig. 3 is a detail view, partly in elevation and broken away, of the carbid-receptacle for use in connection with the lamp. Fig. 4 is a detail fragmentary view illustrating the stop devices for the valve-rod and the indicator to show when the valves are opened and closed. Fig. 5 is a vertical sectional elevation of another embodiment of my invention in which the elements of the lamp are a little differently arranged to enable the reflector to be housed within the lamp-body. Fig. 6 is a horizontal sectional view on the plane indicated by the dotted line 6 6 of Fig. 5, looking in the direction indicated by the arrow. Fig. 7 is a detail view illustrating a modified construction of the carbid-receptacle and the arrangement of the supply-pipe for feeding water to said receptacle, and Fig. 8 is a sectional plan view on the plane indicated by the dotted line 8 8 of Fig. 7.

Like numerals of reference denote corresponding parts in all the figures of the drawings.

In embodying my invention in a portable lamp for use on bicycles, as shown in the accompanying drawings, I construct the body of the lamp to contain the carbid-receptacle, a water-chamber, means for ventilating the interior part of the lamp to obviate excessive heating of the lamp-body by the heat evolved by the generation of the gas, and a reflector for use in conjunction with a lens or glass. All of these elements are present in and common to the different embodiments of the invention shown, respectively, by Figs. 1 to 3, inclusive, and by Figs. 5 and 6.

In the construction of the body of the lamp I preferably employ an outer shell or casing 1 and an inner shell or casing 2, thus forming a double-walled body with an intermediate space or chamber 3 between the two shells, said space providing for the free circulation of a fluid to keep the interior of the lamp in a cool condition. The two shells are united together by the heads 4 5, situated at the bottom and top, respectively, of said shells, and these heads serve as closures for the inner shell to form in connection therewith the gas and water storage chambers of the acetylene-gas-generating lamp. The heads are joined to the shells in any suitable manner, either by riveting or seaming the parts together, and the outer shell 1 may be of a material capable of being ornamented or finished in any desired manner to make the lamp present a neat and attractive appearance.

Within the body formed by the shells and the heads and a suitable distance below the upper head 5 is arranged a partition 6, which is parallel to the head 5 and which is fastened at its edge to the inner shell 2 in any suitable manner. The space between the upper head and the partition forms a water-chamber or storage-tank 7, in which is contained the supply of water to be fed in graduated quantities to the carbid-receptacle 8 for generating the acetylene gas by the chemical union of the calcium carbid with the water.

In the embodiment of the carbid-receptacle 8 shown by Figs. 1, 2, and 3 of the drawings, the receptacle consists of a perforated vessel open at its upper end. The lower part of the carbid vessel is solid and imperforate, and the lower extremity of said receptacle is closed by a head $8^a$, the edge of which is milled or roughened to form a convenient means for grasping the receptacle in fitting it to or withdrawing it from the chamber or space in the body of the lamp. The lower head 4 of the lamp-body is provided with a vertical aperture surrounded by an internal threaded flange or shoulder 9, and the solid or imperforate lower part of the carbid-receptacle 8 is exteriorly screw-threaded at $8^b$ to enable said receptacle to be coupled to the flange or shoulder 9 of the head 4 by screwing the threaded part of the carbid-receptacle into said threaded shoulder or flange 9. This construction enables the carbid-receptacle to be fitted into the lamp-body, at the bottom side thereof, and it also provides for the secure attachment of the carbid-receptacle to the body in a manner to secure tight joints between the receptacle and the lamp-body against the leakage of gas. If desired, a suitable packing may be employed to more securely close the joint between the carbid-receptacle and the lamp-body at the place where the parts are joined together. This carbid-receptacle is provided with a grate 10, which is suitably supported within said receptacle, preferably at a line where the perforations terminate in the body. This grating serves as the support for the calcium carbid contained in the receptacle, and said grating lies a suitable distance above the closed and imperforate end of the carbid-receptacle to form a subchamber (indicated at 11) in which the residuum formed by the union of the calcium carbid with the water is precipitated.

In the embodiment of the invention shown by Figs. 1 and 2 the receptacle 8 is arranged in central relation to the lamp-body, and in order to keep the lamp at a low temperature I have provided the series of circulation-tubes, arranged to extend through the lamp-body and to surround the central carbid-receptacle. These tubes are indicated at 12 in Figs. 1 and 2 of the drawings, and they extend through the lower head 4 and through the partition 6, the chamber 7, and the head 5, whereby the ends of the tubes are open for the free circulation of air through the tubes 12. This construction provides for the utilization of air-currents to assist in cooling the interior chamber and parts of the lamp, so as to obviate undue heating of the lamp by the heat from the gas generated by the chemical union of the calcium carbid and water. I do not, however, desire to restrict myself to the use and arrangement of circulating-tubes for using air to cool the lamp, because I am aware that the tubes may be arranged to utilize water for circulation through the lamp to cool the interior thereof. In utilizing water as the medium for cooling the interior parts of the lamp I arrange the tubes to be used in connection with the water-tank 7 and with a similar tank to be placed at the lower end of the lamp-body, such water tanks or chambers being in communication with the space or chamber 3 between the inner and outer shells of the lamp-body.

The heads of the lamp-body are provided with the circulation-openings 13 at the parts thereof opposite to the space or chamber 3 between the inner and outer shells of the lamp-body. These openings 13 provide for the entrance and exit of air to the space or chamber 3 between the shells to establish a circulation, which tends, in a measure, to contribute to the cooling of the lamp; but when the parts of the lamp-body are constructed to provide for the circulation of water these openings 13 are of course omitted and the top and bottom heads are made imperforate.

The interior of the lamp-body, formed by the inner shell 2, the lower head 4, and the partition 6, forms a gas space or chamber 14 in which is situated the carbid-receptacle and into which chamber 14 flows the gas generated by the admission of water from the tank or chamber 7 to the carbid in the receptacle 8.

In my improved lamp I have isolated the water tank or chamber from the carbid-receptacle and from the gas-chamber in a manner to overcome any tendency of the water to splash into the carbid-receptacle when the lamp is jarred or vibrated, particularly when the lamp is used on moving vehicles, such as bicycles and the like, and I have provided a novel valve mechanism by which the water is admitted in regulated and graduated quantities to the carbid in the receptacle 8. The water-inlet valve for feeding the water from the tank or storage-chamber 7 to the carbid-receptacle is arranged for operation in a peculiar manner with a gas-outlet valve and with a vent-valve, as will be presently fully described, and said water-inlet valve admits only a limited quantity of water to the carbid-receptacle in order to generate just sufficient volume of gas for consumption by the burner when the lamp is in service, it being understood that the lamp is not designed for storing up a quantity of gas for use when the generator is not in service; but, on the contrary, the gas is consumed by the burner practically as fast as it is supplied by the generator.

The lamp for bicycle and analogous service is equipped with a reflector (indicated at 15) and with a lens or glass front 16. These parts may be of the usual or any preferred construction, and within the reflector is arranged a burner 17. (Indicated by dotted lines.) This burner is supplied with gas from a supply-pipe 18, which is carried through the reflector into the chamber 14 and up to the gas-outlet valve 20, the end of the pipe 18 terminating in a mouth 19, which opens into the chamber 14 to provide for the passage of the gas from the chamber 14 through the pipe and to the burner when the valve 20 is opened. The water-inlet valve is indicated at 21 and the vent-valve at 22, and these three valves 20, 21, and 22 are all controlled from a single spindle or rod 24, which extends through all of the valves and is arranged for operation by a thumb-piece or milled head 25. These three valves may be of any preferred construction, as the valves shown in the drawings merely illustrate one type of valve which may be used in connection with the single spindle or stem.

The supply-pipe 18 for the gas-outlet valve is suitably connected to the valve 20, the water-inlet valve 21 is connected by a pipe or tube 26 with the water tank or chamber 7 and provided with a pendent nozzle 27, arranged to discharge the water in limited graduated quantities to the carbid-receptacle 8, and the vent-valve 22 is connected to a vent tube or pipe 28, which is shown as extending through the partition 6, the chamber 7, and the upper head 5 of the lamp-body and with its inner end terminating in an open mouth 29, which communicates with the chamber 14 of the lamp-body. The valve stem or spindle 24 extends horizontally through the lamp and through all three of the valves 20 21 22, and one end of the spindle has the milled head 25 fastened thereto. The other end of the valve spindle or stem passes through the lamp-body and it carries the indicator or pointer $24^a$, which is arranged to play between the stops $24^b$, attached to the outer shell 1 in positions to limit the turning movement of the valve-spindle. This indicator and stop device is provided with suitable inscriptions, as shown by Fig. 4, to indicate when the valve is turned on or off, and the stop devices are placed in positions to limit the spindle or stem to a quarter-turn in either direction. The valve stem or spindle is provided with three ports for use in connection with the three valves 20 21 22, and the port for the gas-valve is indicated at $20^a$, the port for the water-valve at $21^a$, and the port for the vent-valve at $22^a$. The port $22^a$ for the vent-valve passes through the stem or spindle in a direction at right angles to the ports for the gas and water valves, and when the spindle is turned to one position the vent-valve is opened, while the valves for the passage of water and gas are closed, and, vice versa, when the spindle is turned to the other position the vent-valve is closed and the valves 20 21 are opened to permit water to pass to the carbid-receptacle and provide for the passage of the gas to the burner, all as will be readily understood.

As previously explained, the water-inlet valve is constructed to provide for the admission of a very limited quantity of water which is deposited directly upon the calcium carbid contained in the receptacle 8 in order to generate just sufficient gas for consumption by the burner when the lamp is in service; but when it is desired to extinguish the lamp the valve-stem is turned to cut off the entrance of water and the flow of gas, at the same time opening the vent-valve to permit the surplus gas contained in the chamber 14 to escape through said vent-valve. The valve stem or spindle is journaled in suitable bearings provided in the body of the lamp, and said valve-spindle furnishes a very simple and easily-operated means for operating all the valves as may be required in the practical service of a lamp of this character.

In the embodiment of the invention illustrated by Figs. 5 and 6 of the drawings I have shown the three valves and the carbid-receptacle arranged in slightly-different positions for the purpose of placing the reflector within the body or chamber of the lamp. The reflector (indicated at 32) is housed within the chamber 14 of the lamp-body, substantially as shown by the drawings, and in order to arrange the parts to permit of this disposition of the reflector I have placed the carbid-receptacle at the back part of the lamp-body and arranged the water-valve 21 over said carbid-receptacle and at the back of the lamp, and the positions of the vent valve and tube and the gas-outlet valve and the gas-supply pipe have been transposed, all as clearly indicated by Fig. 5. The three valves are, however, arranged in alinement with each other to accommodate the single valve stem or spindle. This modified construction of the lamp contemplates the use of a carbid-receptacle having a lining 33, of porcelain or other analogous vitreous material which is a poor conductor of heat, and this vitreous lining 33 is perforated to correspond with the perforations in the receptacle 8 to permit of the free passage of the gas. I have also provided the reflector with a non-conductor of heat in the form of a lining, (indicated at 34,) and this reflector is equipped with the air-circulation tubes 35 36 to provide for the free passage of air through the reflector and around the burner, such non-conductor or heat-lining 34 being extended around the heat-outlet tube 36 up to the point where the latter passes into the water tank or chamber 7. The described construction and arrangement of parts of the lamp constructed as shown by Figs. 5 and 6 tend to keep the temperature of the lamp to a minimum; but I may provide the lamp with the air or water circulation tubes hereinbefore described and which are indicated by dotted lines in Fig. 6.

In the embodiments of my invention illustrated more particularly by Figs. 1 and 5 the water-inlet valve is arranged above and immediately over the carbid-receptacle to drop the water from the tank directly upon the carbid in the receptacle; but in Figs. 7 and 8 I have illustrated a modified construction of the carbid-receptacle and a water-supply pipe arranged for use in connection with this modified form of the carbid-receptacle. In this form of the invention the carbid-receptacle is provided, at a line between the grating therein and the lower closed end, with a series of radial water-inlet openings 37. The water-supply pipe 38 is extended from the valve 21, down alongside of the carbid-receptacle, and it has its lower end bent into circular form to provide the foot 38$^a$, which fits around the carbid-receptacle, at the radially-perforated part 37 thereof. The inner face of the foot 38$^a$ of the water-pipe is perforated with a multiplicity of openings to discharge the water in the form of a spray through the openings in the carbid-receptacle to have access to the calcium carbid therein. This arrangement of the extended water-pipe does not interfere with the insertion or removal of the carbid-receptacle, because the latter may pass freely through the looped foot in moving the receptacle to insert or withdraw the same, and the arrangement of the water-pipe is advantageous in that the water is admitted to the bottom of the mass of the calcium carbid.

In the use of metallic holders or receivers and fittings of apparatus for containing acetylene gas it is found that with certain metals such as brass and copper, the gas has a chemical action on the exposed surfaces of the metal. This chemical action of the gas evolves an incrustation or salt, which on exposure to the air forms a highly-explosive composition, rendering the use of acetylene-gas appliances dangerous to persons using the apparatus. In the construction of my acetylene-gas appliance I use materials which have their surfaces exposed to the action of the gas protected by a lining or coating which is impervious to the chemical action of the gas, thus obviating the formation of the incrustation or salt. I have found that metal with a protective coating of the composition used in the manufacture of articles known as "granite" ironware is admirably adapted to resist the chemical action of the acetylene gas; but it is evident that a porcelain or other vitreous lining may be used as the protective coating for the metal. I employ, therefore, the metal with a protective surface in the manufacture of the interior shell 2, the partition 6, and the head 4 of the lamp-body. The carbid-receptacle is also formed of metal with this protective coating or lining, and all the interior parts of the apparatus are protected in a similar manner.

It is thought that the operation and the advantages of my invention will be readily understood and appreciated from the foregoing description taken in connection with the drawings.

I am aware that changes in the form and proportion of parts and in the details of construction of the devices herein shown and described as the preferred embodiment of the invention may be made by a skilled mechanic without departing from the spirit or sacrificing the advantages of my invention. I therefore reserve the right to make such modifications and alterations as fairly fall within the scope of the invention.

Having thus fully described my invention, what I claim as new, and desire to secure by Letters Patent, is—

1. In a portable gas-lamp, the body provided with a water-chamber above its generator-chamber and with a series of cooling-tubes which extend through said body, in combination with a carbid vessel secured removably to the body to lie within the generator-chamber adjacent to the cooling-tubes, a burner, and water-inlet and gas-outlet valves, substantially as described.

2. In a portable gas-lamp, a body provided with a water-chamber above its generator-chamber and with an annular series of air-circulating tubes which extend vertically through the generator and water chambers thereof, in combination with a carbid vessel insertible through the bottom of the body and secured removably to said body to lie within the cooling-tubes, a burner communicating with the generator-chamber, and means for supplying water to the carbid vessel substantially as described.

3. In a portable gas-lamp, a body provided with a water-chamber above its generator-chamber, and a reflector housed within the generator-chamber and having the draft and ventilation tubes extending through the body, in combination with a valved tube communicating with the generator-chamber and carrying a burner in front of the reflector, a carbid vessel, and a water-inlet valve between the water-chamber and the carbid vessel, substantially as described.

4. The combination with a generator having an elevated water-chamber, of cooling-tubes extending through the chamber of said generator, a carbid vessel secured removably to the generator and arranged adjacent to the cooling-tubes therein, and means for supplying water in regulated volumes to the carbid vessel, substantially as described.

In testimony that I claim the foregoing as my own I have hereto affixed my signature in the presence of two witnesses.

THOMAS E. SCANTLIN.

Witnesses:
E. G. SIGGERS,
HAROLD H. SIMMS.